United States Patent
Azad et al.

(10) Patent No.: US 11,169,892 B1
(45) Date of Patent: Nov. 9, 2021

(54) DETECTING AND REPORTING RANDOM RESET FAULTS FOR FUNCTIONAL SAFETY AND OTHER HIGH RELIABILITY APPLICATIONS

(71) Applicant: XILINX, INC., San Jose, CA (US)

(72) Inventors: Sarosh Azad, Fremont, CA (US); Akshay Shetty, San Jose, CA (US); Alex Warshofsky, Miami Beach, FL (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 17/169,067

(22) Filed: Feb. 5, 2021

(51) Int. Cl.
*G06F 11/16* (2006.01)

(52) U.S. Cl.
CPC ...... *G06F 11/1625* (2013.01); *G06F 2201/86* (2013.01)

(58) Field of Classification Search
CPC ............. G06F 11/0796; G06F 11/1608; G06F 11/1625; G06F 11/277; G06F 1/24; G01R 31/31703; G01R 31/318516; G01R 31/318519; G01R 31/3193; G01R 31/31932; H03K 19/003; H03K 19/007; G05B 9/00; G05B 19/0425; G05B 19/0428
USPC ....................................... 714/735, 736, 819
See application file for complete search history.

(56) References Cited

U.S. PATENT DOCUMENTS

| | | | | |
|---|---|---|---|---|
| 2006/0170796 A1* | 8/2006 | DeMonte | ............. | H04N 5/3598 348/246 |
| 2011/0264973 A1* | 10/2011 | Ma | .................... | G01R 31/31932 714/736 |
| 2014/0117779 A1* | 5/2014 | Kim | .................... | G05B 19/0428 307/116 |
| 2018/0224843 A1* | 8/2018 | Oishi | ..................... | G05B 15/02 |
| 2018/0260280 A1* | 9/2018 | Traykov | .............. | G06F 11/0796 |
| 2020/0401750 A1* | 12/2020 | Mondal | ................. | G06F 30/323 |

* cited by examiner

*Primary Examiner* — Bryce P Bonzo
*Assistant Examiner* — Albert Li
(74) *Attorney, Agent, or Firm* — Patterson + Sheridan, LLP

(57) ABSTRACT

Embodiments herein describe a hardware solution where a reset monitor in an integrated circuit detects and reports unintentional resets. A glitch in a reset path can cause a logic block to initiate an undesired or unintentional reset. As a result, the local circuitry in the logic block resets which causes them to lose data and their current state. In the embodiments herein, the reset monitor can monitor the reset signals generated within the logic blocks in the circuit. The reset monitor can compare these reset signals to golden copies of the resets signals generated by the reset generator. If a reset signal generated within a logic block does not match the corresponding golden copy of the reset signal, the reset monitor determines that an unintentional reset has occurred.

20 Claims, 4 Drawing Sheets

DETECTING AND REPORTING RANDOM RESET FAULTS FOR FUNCTIONAL SAFETY AND OTHER HIGH RELIABILITY APPLICATIONS

TECHNICAL FIELD

Examples of the present disclosure generally relate to detecting and reporting unintentional resets that cause a portion of an integrated circuit (IC) to reset.

BACKGROUND

Memories are prone to glitches which can flip the state of a memory element or temporarily cause the memory element (e.g., a flip flop or random access memory (RAM)) to output incorrect data. For example, cosmic particles can cause RAM to flip states (e.g., a single bit upset (SBU)) such that it stores incorrect data. Cosmic particles may cause the output of a flip flop to temporarily output a different state, rather than cause the flip flop to store incorrect data. For example, before the glitch, the flip flop may output a HIGH value, but the glitch may cause the flip flop to temporarily output a LOW value for a short time (e.g., a few picoseconds) before returning to its correct output. Industrial and automotive functional safety standards (e.g., IEC61508 and ISO26262) require that silicon devices implement safety mechanisms to ensure that glitches do not lead to a violation of the safety goal of an application that can lead to harm to the vehicle or a person in the vehicle.

To prevent glitches from causing an unintentional reset, reset generators often implement triple redundancy so that a glitch experienced by one memory in the reset generator does not cause the reset generator to inadvertently reset some or all of the circuitry in the IC. However, this does not consider glitches that may occur to memories used in a reset path that connect the reset generator to various logic blocks in the IC. These reset paths can also include buffers which may be susceptible to glitches. Thus, while the reset generator may send the correct reset signal along the path, the memories in that path can experience a glitch that may cause the logic block to receive an unintentional reset signal. In response, the logic block may reset and lose its state. Further, a permanent fault (such as short to ground) may develop in an IC after successful deployment. Such faults needs to be detected in a timely manner to prevent an unsafe condition in the relevant machinery or for the operator/occupant.

SUMMARY

One embodiment describes an integrated circuit that includes a plurality of logic blocks, a reset generator configured to transmit respective reset signals to the plurality of logic blocks where the logic blocks are configured to generate local reset signals based on the respective reset signals, and a reset monitor. The reset monitor is configured to receive the local reset signals from the plurality of logic blocks, compare the local reset signals to golden copies of the respective reset signals that are stored in the reset monitor, and determine, based on the comparison, that one of the local reset signals caused an unintentional reset in a corresponding one of the plurality of logic blocks.

Another embodiment describes an integrated circuit that includes a logic block, a reset generator configured to transmit a first reset signal to the logic block where the logic block is configured to generate a local reset signal based on the first reset signal, and a reset monitor. The reset monitor is configured to receive the local reset signal from the logic block, compare the local reset signal to a golden copy of the first reset signal, and determine, based on the comparison, that the local reset signal caused an unintentional reset in the logic block.

Another embodiment described herein is a method that includes storing a golden copy of a first reset signal in a reset monitor, experiencing a glitch on a reset path between a reset generator and a logic block that causes an unintentional reset in the logic block, resetting the logic block during the unintentional reset, capturing a local reset signal in the reset monitor generated by the logic block during the unintentional reset, and determining the unintentional reset occurred in the logic block by comparing the golden copy to the local reset signal.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

DETAILED DESCRIPTION

Figure 1:
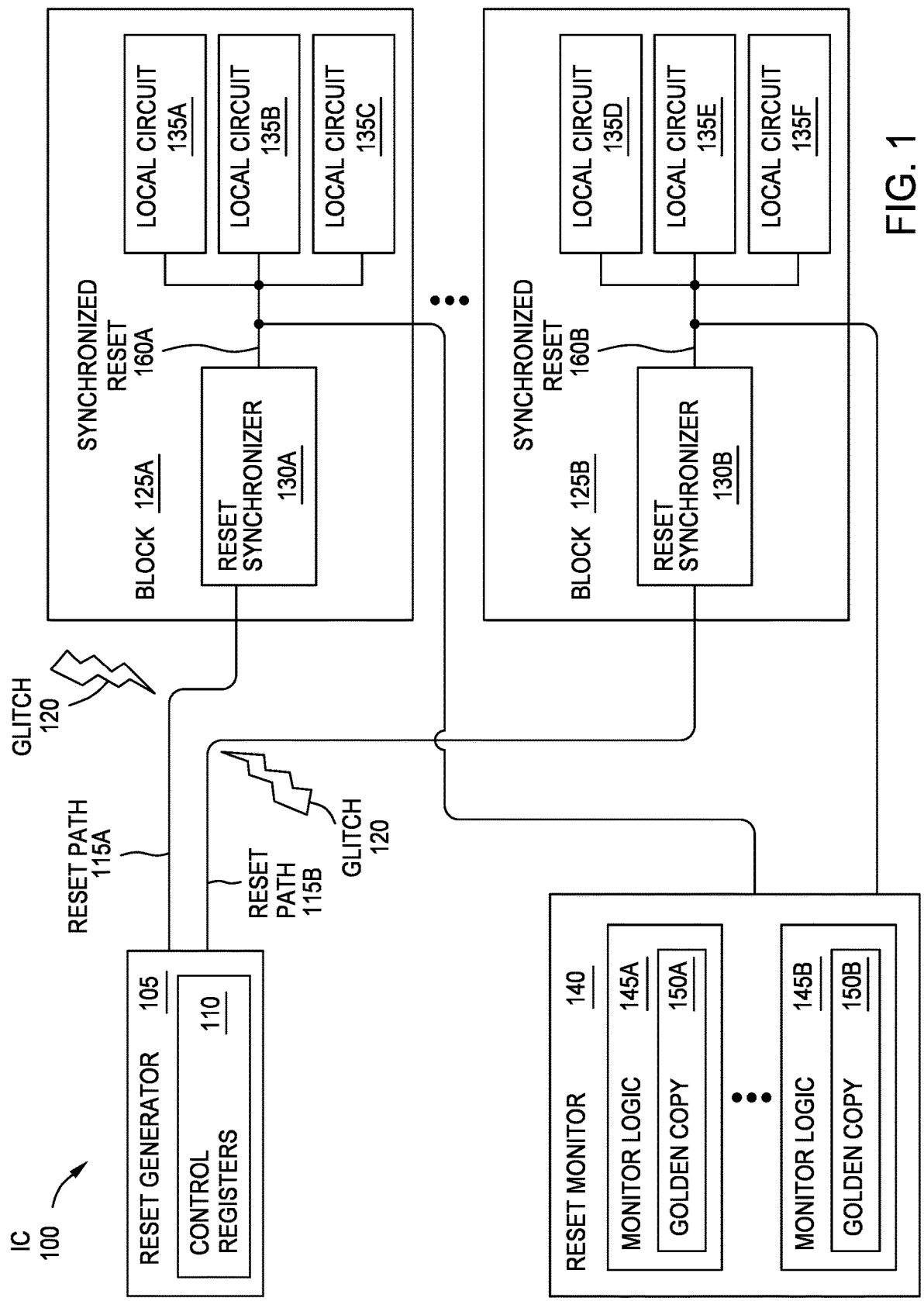
FIG. 1 illustrates an IC with a reset monitor to detect and report an unintentional reset, according to an example.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Rather than relying on a software/firmware solution to detect unintentional resets, the embodiments herein provide a hardware solution where a reset monitor in an IC can detect and report unintentional resets. As explained above, a glitch in a reset path can cause a logic block to initiate an undesired or unintentional reset. As a result, the local circuitry in the logic block resets which causes them to lose data and their current state. It is very difficult for software or firmware to detect when an unintentional reset has occurred since it can happen in only a few clock cycles. Instead, in the embodiments herein, the reset monitor monitors the local reset signals generated within the logic blocks in the circuit. The reset monitor can continuously compare these local reset signals to golden copies of the reset signals generated by the reset generator. These golden copies may be generated using triple redundancy or some other redundancy technique to ensure they store the correct version of the reset signals. If a reset signal generated within a logic block does not match the corresponding golden copy of the reset signal, the reset monitor determines that an unintentional reset has occurred. Further, this comparison can detect an error involving a logical block not getting reset (or staying in reset) even when the reset generator and the golden copy has the reset in the asserted state. The reset monitor can then report this error to the software or firmware so it can take an appropriate action.

FIG. 1 illustrates an IC 100 with a reset monitor 140 to detect and report an unintentional reset, according to an example. As shown, the IC 100 includes a reset generator 105 that has control registers 110. These control registers 110 can store respective reset values used to generate reset signals for logic blocks (i.e., block 125A and 125B) in the IC 100. For example, when a user or the firmware/software wants to reset a particular block 125, the corresponding control register 110 for that block is updated (e.g., changed from a HIGH to a LOW value). In response, the reset generator 105 transmits a reset signal on a corresponding reset path 115 to the logic block 125 which causes the logic block 125 to reset. For example, if the control registers 110 indicate that block 125A should be reset, the reset generator 105 changes the value of the signal on the reset path 115A from a non-reset value (e.g., a HIGH value) to a reset value (e.g., a LOW value). In response to the reset path 115A transmitting the reset value, the block 125A resets its local circuitry 135.

In one embodiment, the reset generator 105 implements a redundancy technique (e.g., triple modular redundancy) to ensure a glitch such as an SBU does not instruct a block 125 to reset. However, it is more difficult to implement a redundancy technique on the reset paths 115 to ensure a glitch in the circuit elements (not shown) in the paths 115 does not cause an unintentional reset. These circuit elements can include memory elements, a buffer, or a voltage/current on a wire. For example, a memory element (or buffer) along one of the reset paths 115 may experience a glitch 120 that causes the memory element to flip states, or to temporarily output the opposite value. For instance, the reset generator 105 may currently be driving a non-reset value on the reset path 115A (e.g., a HIGH value), but the glitch 120 may cause one of the memory elements in the path 115A to temporary output a reset value (e.g., a LOW value). This glitch 120 may affect the output of the memory element in the path 115A for only a short time, which can even be less than a clock cycle (e.g., one or more picoseconds). Nonetheless, in many scenarios, the reset paths 115 are asynchronous which means even a glitch 120 that has a very short effect on the output of a memory element can cause downstream memory elements in the reset path 115 to latch and store the reset value. Put differently, even if the glitch 120 causes a memory element in the path 115A to output the reset value for a very short time (only 1 picosecond), the remaining downstream memory elements in the path 115A can propagate this reset value to the block 125A. This short change in the reset value may be enough to cause the block 125A to perform a reset. That is, the signal transmitted by the reset path 115A does not have to be at the reset value for a full clock cycle (or several clock cycles, although it can be) in order to trigger a reset of the block 125A.

As shown, the block 125A includes a reset synchronizer 130A that detects and captures a reset event that is transmitted on the reset path 115A. While triggering the reset may be asynchronous (i.e., the reset event does not have to be tied to a clock edge), the reset synchronizer 130A may stop the reset synchronously. That is, the reset synchronizer 130A can asynchronously detect when a reset has been initiated, but ensure that the local circuitry 135 in the logic block 125A begin operating following the reset in a synchronous manner. To do so, the reset synchronizer 130A generates a synchronized, local reset signal 160A in response to detecting an asynchronous reset event on the reset path 115A. Thus, while the reset signal on the reset path 115A may have changed to the reset value (e.g., the LOW value) for only a very short period of time (as is often the case during an unintentional reset), the reset synchronizer 130A generates a synchronized local reset signal 160A that "holds" this value for several clock cycles so that the reset remains asserted long enough for logic elements in the local circuitry 135A-C to detect the signal 160A and be reset, and also ensures that the reset is de-asserted synchronous to the clock. Unlike the signals received on the reset path 115A, the synchronized reset signal 160A is synchronized with the local clock in the logic block and may be held at the reset value (e.g., the LOW value) for one or more clock cycles. Thus, the reset synchronizer 130A can ensure that all the local circuits 135 stop receiving the synchronized reset signal 160A at the same time (e.g., at a specific rising or falling edge of the local clock). As a result, the local circuits 135 begin operating at the same time following a reset.

However, the reset synchronizer 130A may initiate a reset, regardless of whether that reset was intentional or unintentional. To determine whether a reset performed by the synchronizer 130A was intentional or unintentional, the IC 100 includes a reset monitor 140 that receives the synchronized reset signals 160A and 160B from the logic blocks 125A and 125B. The reset monitor 140 includes monitor logics 145 (one copy for each resettable logic block in the IC 100) that receive the synchronized reset signal 160 and compares them to golden copies 150. If the values of a synchronized reset 160 and the golden copies 150 indicate that an unintentional reset occurred, then the monitor logic 145 can report the error to software or firmware. Since in this example the reset monitor 140 includes a monitor logic 145 for each block 125, the reset monitor 140 can individually determine which logic block 125 was unintentional reset. As a result, the software or firmware can determine which block 125 in the IC 100 was reset. This information might be useful for the software or firmware to then decide what action to take in response to the unintentional reset (or whether no action is necessary).

The embodiments herein are not limited to any particular action taken by the software or firmware after detecting an unintentional reset. In some examples, the software may perform a safe stop in response to detecting an unintentional reset. In another embodiment, the software may reset the entire IC. In yet another example, the software may not take any action. Further, the action (or inaction) taken by the software may depend on which block 125 in the IC experienced the unintentional reset. For example, the software may take no action if a low priority block that is unrelated to safety experiences an unintentional reset, but may take an action if a high priority block that is critical to the safe operation of the system experiences the unintentional reset.

Figure 2:
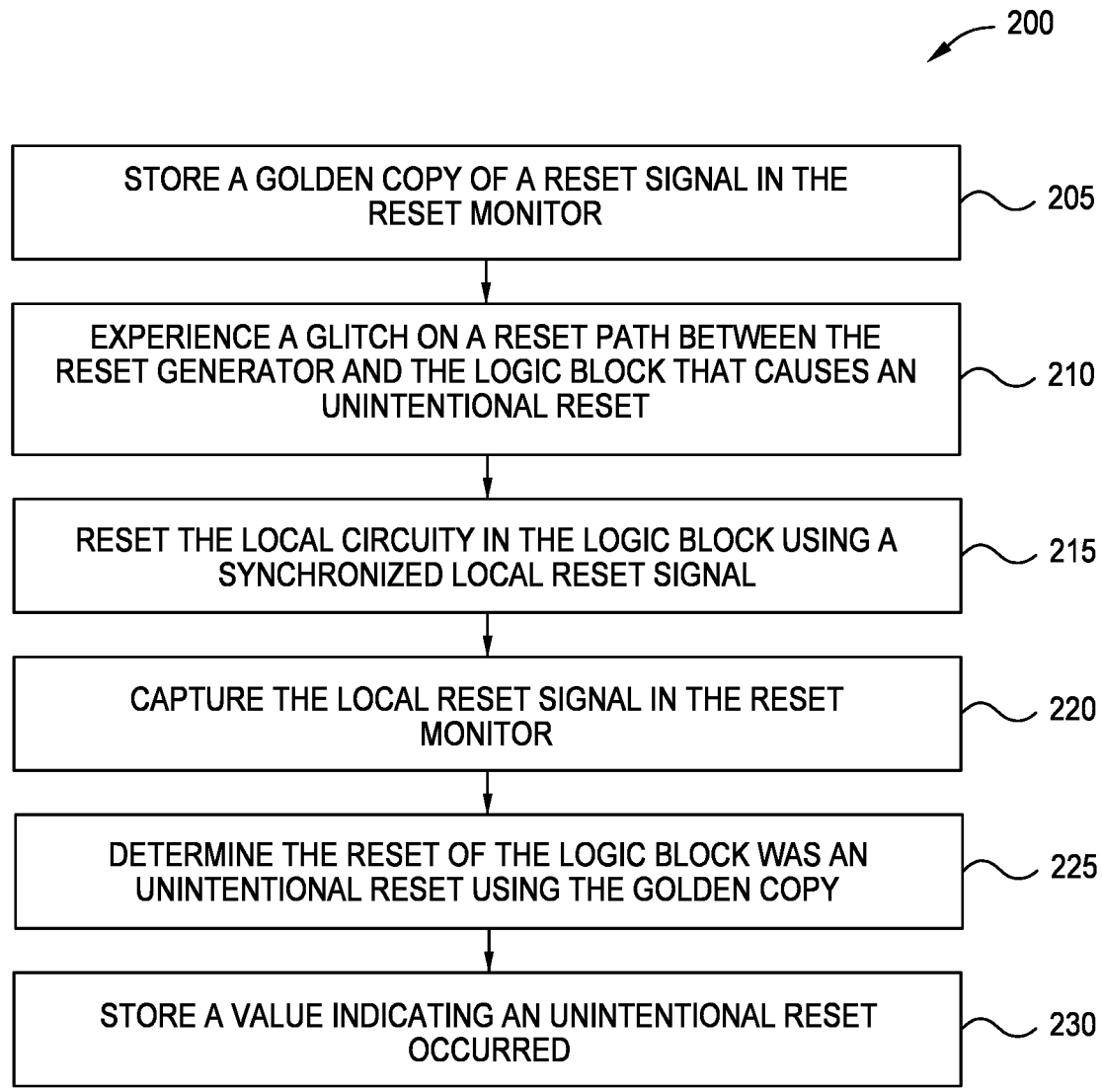
FIG. 2 is a flowchart for detecting and reporting unintentional resets, according to an example.

FIG. 2 is a flowchart of a method 200 for detecting and reporting unintentional resets, according to an example. For clarity, the method 200 is discussed in tandem with FIG. 3 which is a block diagram of monitor logic for detecting and reporting an unintentional reset.

Figure 3:
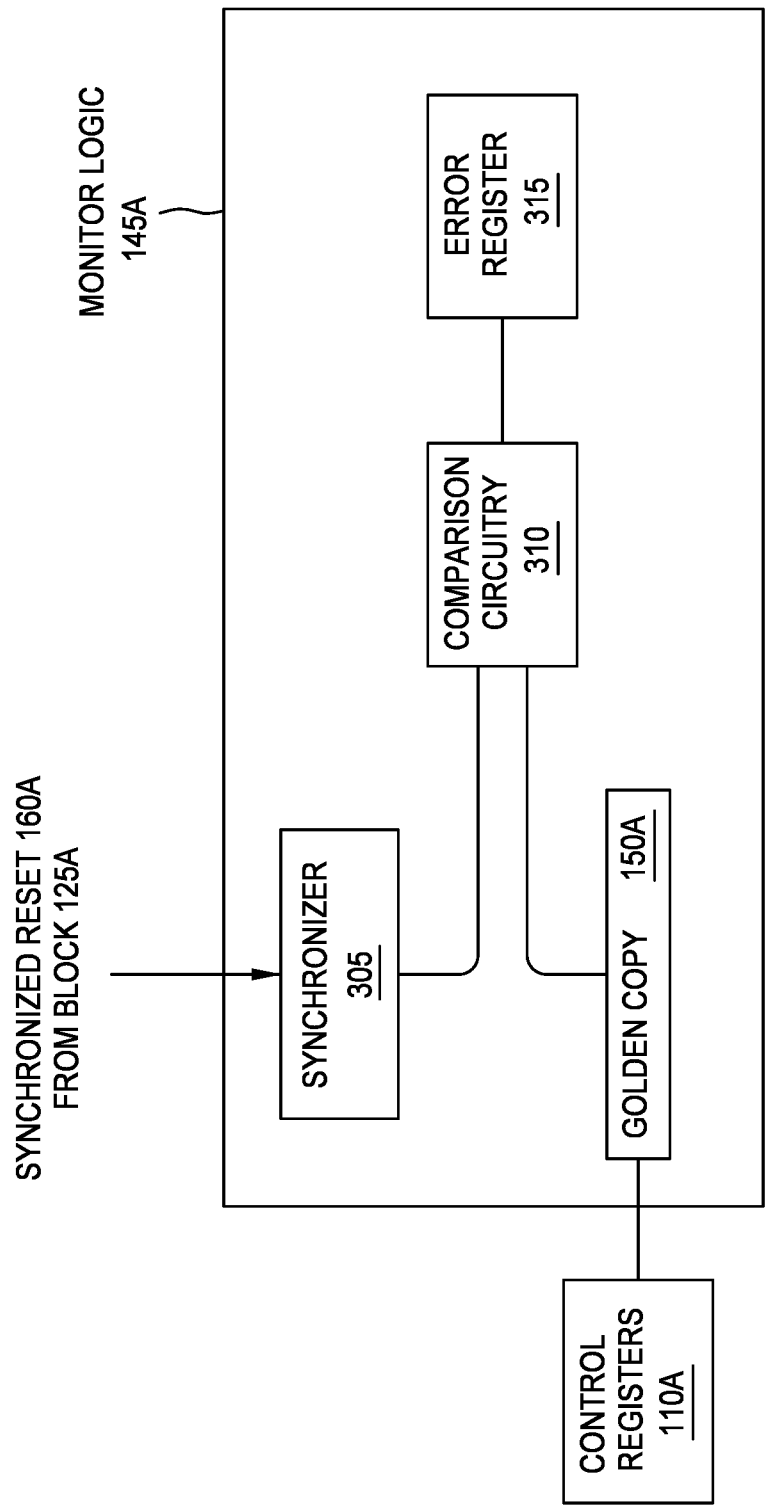
FIG. 3 is a block diagram of monitor logic for detecting and reporting an unintentional reset, according to an example.

At block 205, the IC stores a golden copy of a reset signal in a reset monitor. As discussed above, the control registers 110, which are disposed in the reset generator, store the reset signals for the blocks (not shown) in the IC. In addition to using the outputs of the control registers 110 to transmit the reset signals to the blocks, the outputs of the control registers 110 are coupled to the monitor logic 145. As shown in FIG. 3, the output of control register 110A is coupled to a register storing the golden copy 150A for the monitor logic 145A. That is, FIG. 3 illustrates one instantiation of monitor logic 145A that can monitor a particular block in the IC. The other control registers 110 can be coupled to other instantiations of the monitor logic 145 in order to detect unintentional resets for other logic blocks in the IC.

The golden copy 150A stores the desired, or actual, value of the reset signal for the corresponding block. As discussed below, the golden copy 150A can be used to detect when the corresponding block has experienced an unintentional reset.

At block 210, the IC experiences a glitch on a reset path between the reset generator and the logic block that causes an unintentional reset. As mentioned above, the glitch may be less than a clock cycle (e.g., less than several picoseconds) that temporarily changes the output of a memory element or buffer along the reset path. Alternatively, the glitch may flip the state of the memory element such that it constantly outputs the incorrect reset signal (e.g., for multiple clock cycles). In any case, this glitch causes the logic block to perform an unintentional reset. In one embodiment, the glitch that causes the unintentional reset occurs along an asynchronous reset path, but in other examples the glitch may occur along a synchronous reset path.

At block 215, the logic block resets the local circuitry using a synchronized, local reset signal that was initiated by the glitch. That is, the system performs an asynchronous assertion of reset, but performs a synchronous de-assertion of reset. In this example, the logic block includes a reset synchronizer that captures a reset event along the reset path (which may be asynchronous or synchronous) and generates a synchronized reset signal for resetting the local circuitry in the logic block. One advantage of generating a local, synchronized reset signal is that the logic block can ensure the local circuitry exits from the reset at the same time (e.g., at the same clock edge) so the circuitry resumes operation in parallel. In one embodiment, the local synchronized reset signal is held at the reset value for several clock cycles to provide the local circuitry with sufficient time to reset, although one clock cycle may be sufficient in some embodiments to reset the logic block.

At block 220, the reset monitor captures the synchronized reset signal generated at block 215. That is, in addition to the reset synchronizer in the logic block transmitting the synchronized, local reset signal to all the local circuitry in the block, the reset synchronizer also transmits the local reset signal to the reset monitor, and more particular, to the monitor logic in the reset monitor tasked with monitoring the resets performed by the logic block.

As shown in FIG. 3, the monitor logic 145A includes an input for receiving the synchronized, local reset signal 160A from the block 125A. This is the same local reset signal 160A used in the block 125A to reset its local circuitry (e.g., the local circuitry 135A-C illustrated in FIG. 1). In this manner, the monitor logic 145A can detect when the logic block 125A has performed a reset. The monitor logic 145A includes a synchronizer 305 which can detect reset events in the logical block 125A. In one embodiment, the synchronizer 305 may be used when the monitor logic 145A uses a different clock signal than the logic block 125A. However, if they are part of the same clock domain, then the synchronizer 305 may be omitted.

At block 225, the monitor logic determines whether a detected reset in the corresponding logic block was intentional or unintentional using the golden copy. That is, the monitor logic can compare the synchronized reset signal 160A received from the logic block 125A with the golden copy 150A stored in a local memory element in the monitor logic 145A. If the signals match, this indicates that either (1) no reset was performed or (2) a reset was performed, but it was intentional. However, if the signals do not match, this indicates the logic block performed a reset and it was unintentional (i.e., was caused by a glitch rather than the reset generator, or the logic block did not perform an intentional reset because there was a fault causing the block not being able to reset).

To determine whether a reset was intentional or unintentional, the monitor logic 145A includes comparison circuitry 310 that compares the received synchronized reset signal 160A provided by the synchronizer 305 to the value of the golden copy 150A, which reflects the value of the control register 110A. The comparison circuitry 310 can include any type of comparison logic to determine whether the reset was intentional or unintentional. While the embodiments herein describe that a reset was unintentional when the values of the synchronized reset signal 160A and the golden copy 150A do not match, it may be desired to design a system where a match indicates the reset was unintentional while non-matching values indicate the reset was intentional (or no reset has occurred).

At block 230, the monitor logic stores a value indicating whether an unintentional reset occurred. As shown in FIG. 3, if the comparison circuitry 310 detects an unintentional reset, it can set the value stored in an error register 315 accordingly. Thus, the software or firmware in the system can monitor (e.g., periodically poll) the error register 315 to identify when an unintentional reset occurred. In another embodiment, the monitor logic 145A may send an interrupt to the software (e.g., an operating system) to indicate that an unintentional reset occurred.

Because the IC can have a separate copy of the monitor logic 145 for each logic block, by monitoring the error registers 315 in each monitor logic 145, the software can determine which block (or sub-portion) of the IC experienced the unintentional reset. This may enable the software to perform a more tailored or intelligent action in response to the unintentional reset (e.g., depending on whether the unintentional reset occurred in a low or high priority logic block).

Figure 4:
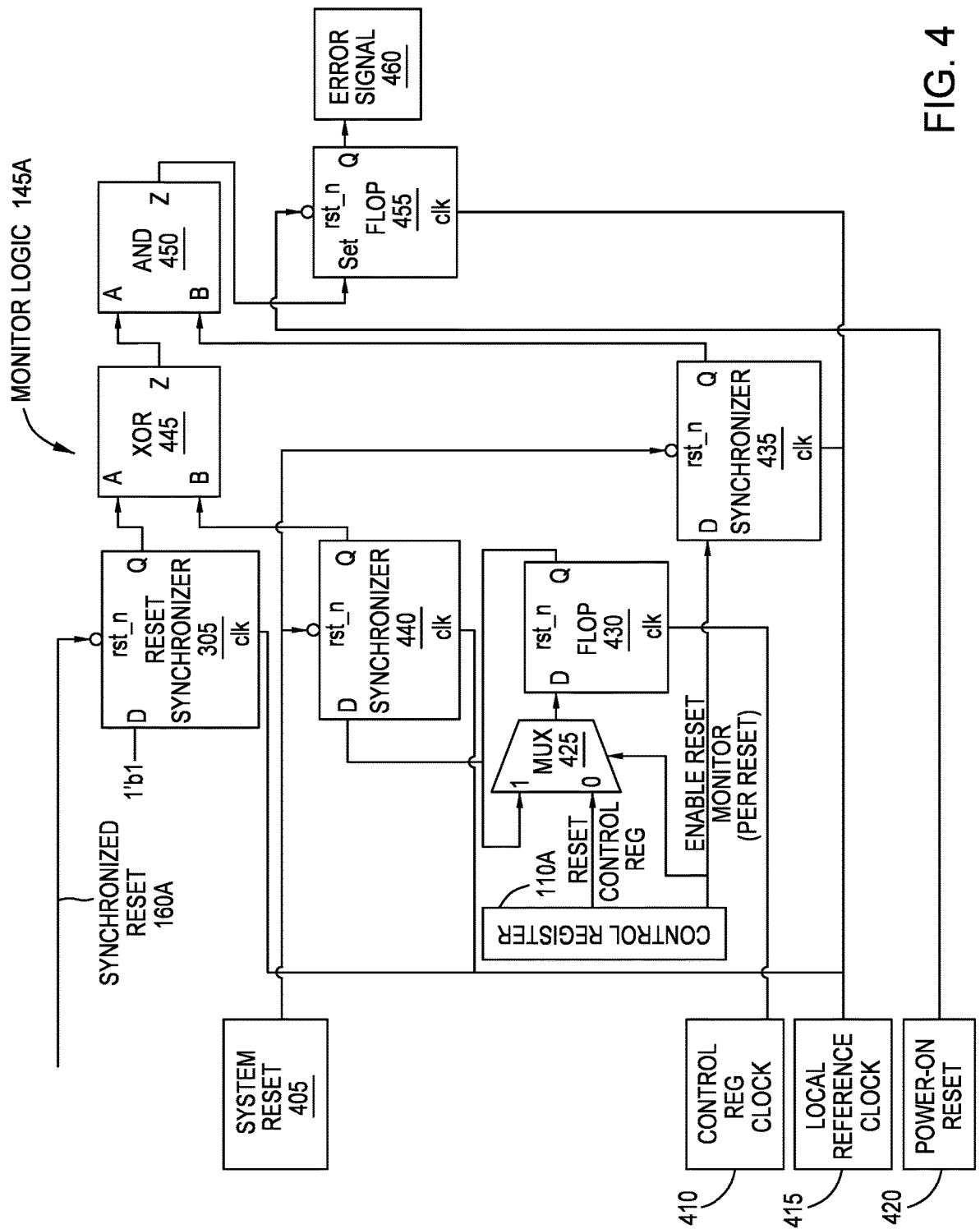
FIG. 4 is a block diagram of monitor logic for detecting and reporting an unintentional reset, according to an example.

FIG. 4 is a block diagram of monitor logic 145A for detecting and reporting an unintentional reset, according to an example. That is, FIG. 4 illustrates a more detailed implementation of the monitor logic 145A. However, FIG. 4 is just one example of the monitor logic 145A, and it can be implemented using other circuit designs.

In FIG. 4, the control register 110A is coupled to a mux 425 and a synchronizer 435. While the control register 110A is shown as being within the monitor logic 145A, it may be disposed within the reset generator (e.g., the reset generator 105 in FIG. 1) and thus be external to the monitor logic 145A. However, if the reset monitor and the monitor logic 145A are part of the reset generator, then the control register 110A may be considered part of the monitor logic 145A. In any case, the control register 110A is communicatively coupled so that its stored value (i.e., the current value of the reset signal) can be received at the monitor logic 145A.

As shown, the control register 110A provides a reset control register (reg) signal to the mux 425 and an enable reset monitor signal to the synchronizer 435. The reset control reg signal is the current value of the reset signal. In the examples below, it is assumed that when the reset control reg signal has a LOW value (logical 0), the reset generator is resetting the corresponding logic block (not shown in FIG. 4) while a HIGH value (logical 1) indicates the reset generator does not want to reset the logic block. The enable reset monitor signal is for providing an option to software to select when monitor logic should be actively monitoring the reset. This enable signal is de-asserted (switched to 0 in this case) before the value of the reset control register is changed. This signal is a select signal for the mux 425. When the reset control register is being changed, the enable reset monitor signal has a logical 0 (LOW value). Otherwise, this signal has a logical 1 value, which means the mux 425 provides a feedback loop where the output of the flop 430 (which stores the golden copy of the register 110A) is sent to its input (i.e., the flop 430 continues to save its old value).

When the reset control register is not being changed, the enable reset monitor signal is a logical 1, which means the flop 430 continues to store the previous value of the reset signal as the golden copy (e.g., a logical 1 in this case) indicating that the reset control register is not currently being written into intentionally. The output of the flop 430 (i.e., the golden copy) is transmitted to a synchronizer 440 which captures the output of the flop 430 (since the downstream logic in the monitor logic 145A may operate on a different clock—i.e., a local reference clock 415—rather than the clock used by the flop 430—i.e., a control reg clock 410). The synchronizer 440 passes the golden copy to Input B of an XOR gate 445. Assuming the reset generator is not performing a reset, the golden copy of the reset signal is a logical 1, which is received at the input B of the XOR gate.

The XOR gate 445 also receives at Input A the value of the synchronized local reset signal 160A from the reset synchronizer 305. While FIG. 1 illustrates receiving the synchronized reset signal 160A, the monitor logic 145A can receive any monitored reset and is not limited to the signal 160A. Assuming there is no glitch and the reset generator is not performing a reset, the value of the synchronized reset signal 160A at Input A of the XOR gate 445 is a logical 1. Because both the inputs A and B are logical 1's (i.e., the golden copy and the local reset signal 160A have the same value), the output of the XOR gate 445 is a logical 0, which is provided to Input A of an AND gate 450. Regardless of the value of Input B, the output of the AND gate 450 is a logical 0 indicating that there was no unintentional reset in the corresponding logic block since the values of the golden copy and the synchronizer reset signal 160A matched. In other words, the output value of the AND gate 450 is a logical 0 when either (1) the reset control register is being intentionally changed or (2) no reset is performed at the corresponding logic block. The Input B of the AND gate 450 is being driven by synchronized version of Enable (originally coming from the control register). The purpose of this signal is to mask the error generated (when inputs of XOR gate 445 differ) when the reset monitor for the particular reset is not enabled (Enable=logical 0) and to only let the error pass through to the flop 455 when the reset monitor for the particular reset is enabled (Enable=logical 1).

However, when an unintentional reset occurs, the value of the synchronized reset 160A switches to a logical 0 rather than a logical 1. The flop 430 which stores the golden copy continues to output a logical 1. Thus, the inputs of the XOR gate 445 are a logical 0 and a logical 1 which causes the XOR gate 445 to output a logical 1. This logical 1 is received at Input A of the AND gate 450. Because the enable reset monitor signal also has a logical 1 value (because the reset monitor is currently enabled), the synchronizer 435 outputs a logical 1 to Input B of the AND gate 450 which in turn outputs a logical 1.

As shown, the output of the AND gate 450 is a set signal for a flop 455 (e.g., an error register) which is tasked with storing an indication that an unintentional reset occurred. When the set signal is a logical 1, the flop 455 stores a value indicating an unintentional reset occurred. Conversely, when the set signal is a logical 0 (which is the case when no reset is performed, or when an intentional reset is performed), the flop 455 maintains whatever value was stored previously. Thus, if an unintentional reset occurs, the output of the AND gate 450 sets the value of the flop 455 to output an error signal 460 indicating an unintentional reset has occurred in the corresponding logic block. However, when the unintentional reset is over (and the synchronized reset signal 160A returns to a logical 1 value), the flop 455 continues to output the error signal 460 indicating an unintentional reset occurred. As a result, software or firmware can later poll the flop 455 to detect that an unintentional reset has occurred. Put differently, software or firmware do not have to constantly poll the monitor logic 145A to determine when an intentional reset occurs. The flop 455 can instead save data indicating that an unintentional reset occurred which can later be read by the software or firmware. However, in other embodiments, the monitor logic 145A may initiate an interrupt which immediately informs the software or firmware that an error occurred rather than saving that data in the flop 455 and waiting for the software and firmware to read the error signal 460 output by the flop 455.

For completeness, the state of the monitor logical 145A during an intentional reset will now be described. In that case, the value of the enable reset monitor signal changes to a logical 0 which causes the mux 425 to instead output the value of the reset control reg signal provided by the control register 110A. During an intentional reset, the value of this signal is a logical 0 which is then stored in the flop 430 as the golden copy.

Now, Input B of the XOR gate 445 is a logical 0 (i.e., the value of the golden copy) and the Input A is also a logical 0 (i.e., the value of the synchronized local reset signal 160A). The output of the XOR gate 445 is a logical 0 (since its input values match) which is then provided to Input A of the AND gate 450. As a result, regardless of the value of Input B of the AND gate 450, the output of the AND gate 450 is a logical 0 indicating an unintentional reset did not occur. As a result, the state of the flop 455 does not change. That is, if the flop 455 previously stored a default value indicating that no unintentional reset was detected in the logic block, then it continues to store that value. If the flop 455 previously stored a value indicated that there was an intentional reset detected in the logic block, it also continues to store that same value. Thus, an intentional reset does not change the state of the flop 455 and the value of the error signal 460.

Once the intentional reset is over, software writes to the reset control register by first disabling the reset monitor logic for the reset (Enable=logical 0) and then de-asserting the reset by writing the appropriate value to the reset register. Once de-asserted, software can choose to continue to monitor the reset by again enabling the monitor (Enable=logical 1). Thus, if the synchronized reset signal 160A later changes from a logical 1 to a logical 0, the inputs to the XOR gate 445 will no longer match (since the value of the golden copy stored in the flop 430 is a logical 1) indicating an unintentional reset has occurred in the corresponding logic block as discussed above.

While FIG. 4 includes the synchronizers 305, 435, and 440, these are to facilitate the fact that various circuitry in the monitor logic 145A operate using separate clocks or clock domains (i.e., the control reg clock 410 and the local reference clock 415). Further, if the incoming monitored reset signal (e.g., the synchronized signal 160A) is a glitch, the synchronizer 305 will get asserted for multiple cycles. This is what will cause the circuitry further downstream to be able to detect the glitch.

Further, FIG. 4 includes a power-on reset 420 which is a higher-level reset than the system reset 405 and drives the reset pin of the flop 455. The reason for this flop 455 to be on a higher-level reset is to avoid a case where a local system reset caused the error register history to be lost. After the software or firmware reads the error signal 460 and determines that an unintentional reset occurred, it performs the necessary action and clears this error flop 455 by writing to a clear bit (that software has access to and not shown in the figure) to clear the value of the flop 455 to a default value indicating that no unintentional reset has occurred. Thus, if another unintentional reset occurs in the future, the monitor logic 145A can again change the state of the flop 455 so that when the software or firmware again reads the error signal 460 it can determine that another unintentional reset occurred in the corresponding logic block.

FIG. 4 also includes a system reset 405 for resetting the monitor logic 145A. The system reset 405 may be controlled by the reset generator so the monitor logic 145A can be reset similar to how one of the logic blocks 125 illustrated in FIG. 1 can be reset. System reset is a reset that would generally be used for resetting most flops (other than ones keeping track of errors or for debugging purpose) in a particular domain.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the users computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit, comprising:
    a plurality of logic blocks;
    a reset generator configured to transmit respective reset signals to the plurality of logic blocks, wherein the logic blocks are configured to generate local reset signals based on the respective reset signals; and
    a reset monitor configured to:
        receive the local reset signals from the plurality of logic blocks;
        compare the local reset signals to golden copies of the respective reset signals that are stored in the reset monitor; and
        determine, based on the comparison, that one of the local reset signals caused an unintentional reset in a corresponding one of the plurality of logic blocks.

2. The integrated circuit of claim 1, further comprising:
    reset paths extending between the reset generator and the plurality of logic blocks, wherein the unintentional reset is caused by a glitch occurring in one of the reset paths.

3. The integrated circuit of claim 2, wherein the glitch temporarily changes an output of a circuit element in the one of the reset paths.

4. The integrated circuit of claim 1, further comprising:
    reset synchronizers in the plurality of logic blocks configured to receive the respective reset signals and generate the local reset signals.

5. The integrated circuit of claim 4, wherein the respective reset signals perform asynchronous reset assertion but the local reset signals perform synchronous reset de-assertion.

6. The integrated circuit of claim 1, wherein the reset monitor comprises:
    comparison circuitry configured to compare the local reset signals to the golden copies of the respective reset signals.

7. The integrated circuit of claim 6, wherein the comparison circuitry comprises an XOR gate to receive one of the local reset signals and one of the golden copies, wherein an output of the XOR gate is an input to an AND gate.

8. The integrated circuit of claim 7, wherein an output of the AND gate is configured to set a value in an error register to indicate the unintentional reset was determined.

9. An integrated circuit comprising:
    a logic block;
    a reset generator configured to transmit a first reset signal to the logic block, wherein the logic block is configured to generate a local reset signal based on the first reset signal; and
    a reset monitor configured to:
        receive the local reset signal from the logic block;
        compare the local reset signal to a golden copy of the first reset signal; and
        determine, based on the comparison, that the local reset signal caused an unintentional reset in the logic block.

10. The integrated circuit of claim 9, further comprising:
    a reset path extending between the reset generator and the logic block, wherein the unintentional reset is caused by a glitch occurring in the reset path.

11. The integrated circuit of claim 9, further comprising:
    a reset synchronizer in the logic block configured to receive the first reset signal and generate the local reset signal.

12. The integrated circuit of claim 9, wherein the first reset signal performs asynchronous reset assertion but the local reset signal performs synchronous reset de-assertion.

13. The integrated circuit of claim 9, wherein the reset monitor comprises:
    comparison circuitry configured to compare the local reset signal to the golden copy of the first reset signal.

14. The integrated circuit of claim 13, wherein the comparison circuitry comprises an XOR gate to receive the local reset signal and the golden copy, wherein an output of the XOR gate is an input to an AND gate.

15. The integrated circuit of claim 14, wherein an output of the AND gate is configured to set a value in an error register to indicate the unintentional reset was determined.

16. A method, comprising:
    storing a golden copy of a first reset signal in a reset monitor;
    experiencing a glitch on a reset path between a reset generator and a logic block that causes an unintentional reset in the logic block;
    resetting the logic block during the unintentional reset;
    capturing a local reset signal in the reset monitor generated by the logic block during the unintentional reset; and
    determining the unintentional reset occurred in the logic block by comparing the golden copy to the local reset signal.

17. The method of claim 16, further comprising:
    storing a value in an error register indicating that the unintentional reset occurred.

18. The method of claim 16, wherein the reset path connects the logic block to the reset generator, wherein the method comprises:
 transmitting the first reset signal from the reset generator to the logic block using the reset path.

19. The method of claim 18, wherein the reset generator, the logic block, and the reset monitor are in a same integrated circuit.

20. The method of claim 16, wherein the first reset signal performs asynchronous reset assertion but the local reset signal performs synchronous reset de-assertion.

* * * * *